US 8,170,958 B1

(12) United States Patent
Gremett et al.

(10) Patent No.: US 8,170,958 B1
(45) Date of Patent: May 1, 2012

(54) INTERNET REPUTATION MANAGER

(75) Inventors: Peter Gremett, Sunnyvale, CA (US);
Lucy Beard, San Diego, CA (US);
Laura Joanne Messerschmitt, San Carlos, CA (US); Paula Frediani, Belmont, CA (US); Catherine Nixon Harrell, London (GB); Sarah Varki, San Francisco, CA (US); Kira Scherer Wampler, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 599 days.

(21) Appl. No.: 12/362,117

(22) Filed: Jan. 29, 2009

(51) Int. Cl.
*G06Q 99/00* (2006.01)
(52) U.S. Cl. ...................................... 705/347
(58) Field of Classification Search .............. 705/26.1, 705/347
See application file for complete search history.

(56) References Cited

U.S. PATENT DOCUMENTS

| | | | | |
|---|---|---|---|---|
| 7,870,025 B2* | 1/2011 | English | ............ | 705/14.49 |
| 7,895,177 B2* | 2/2011 | Wu | ............ | 707/706 |
| 7,962,461 B2* | 6/2011 | Ruhl et al. | ............ | 707/706 |
| 8,082,295 B2* | 12/2011 | Nickerson et al. | ............ | 709/203 |
| 2003/0055723 A1* | 3/2003 | English | ............ | 705/14 |
| 2004/0019688 A1* | 1/2004 | Nickerson et al. | ............ | 709/229 |
| 2004/0107137 A1* | 6/2004 | Skinner | ............ | 705/14 |
| 2006/0009994 A1* | 1/2006 | Hogg et al. | ............ | 705/1 |
| 2006/0129446 A1* | 6/2006 | Ruhl et al. | ............ | 705/10 |
| 2007/0083472 A1* | 4/2007 | Israel | ............ | 705/55 |
| 2008/0004941 A1* | 1/2008 | Calabria | ............ | 705/10 |
| 2008/0133488 A1* | 6/2008 | Bandaru et al. | ............ | 707/3 |
| 2008/0288481 A1* | 11/2008 | Zeng et al. | ............ | 707/5 |
| 2009/0119268 A1* | 5/2009 | Bandaru et al. | ............ | 707/3 |
| 2009/0144070 A1* | 6/2009 | Psota et al. | ............ | 705/1 |
| 2009/0171992 A1* | 7/2009 | Roberts | ............ | 707/100 |
| 2009/0193011 A1* | 7/2009 | Blair-Goldensohn et al. | ... | 707/5 |
| 2009/0299824 A1* | 12/2009 | Barnes, Jr. | ............ | 705/10 |

OTHER PUBLICATIONS

Unknown author, "Communispace Launches 15 New Online Customer Communities," Internet Business News, Aug. 1, 2006.*

* cited by examiner

*Primary Examiner* — Amee A Shah
(74) *Attorney, Agent, or Firm* — McKay and Hodgson, LLP; Philip McKay; Sean P. Lewis

(57) ABSTRACT

A method and apparatus for providing an on-line reputation manager whereby review and/or ratings data associated with a given business and/or product is obtained from two or more Internet based business ratings/review system sources. The review and/or ratings data is aggregated, and/or processed, according to one or more aggregation/processing parameters. The aggregated, and/or processed, review and/or ratings data is then provided to an owner, manager, and/or agent of the given business. The review and/or ratings data is then monitored and updated periodically and/or on the occurrence of specified trigger events.

33 Claims, 3 Drawing Sheets

CONGRATULATIONS!

YOUR BUSINESS HAS AN OVERALL RATING OF 3 STARS BASED ON TWO REVIEWS FROM CUSTOMERS

IF YOU WISH TO SEE THE DETAILED REVIEWS OF YOUR BUSINESS YOU CAN VIEW THEM AT:

WWW.ON-LINE REPUTATION MANAGER.COM

FIG. 3

INTERNET REPUTATION MANAGER

BACKGROUND

The emergence of the Internet as a major source of information and/or communication for many consumers has led to the development of numerous websites that are either devoted to, or at least include, business and/or product review and/or ratings systems. Herein, websites devoted to, or at least including, business and/or product review and/or ratings systems are generically referred to as Internet based business ratings/review systems.

A typical Internet based business ratings/review system provides a review forum, and/or ratings system, and/or recommendation service, whereby consumers can share their opinions of a given business and/or product with other potential consumers of the business and/or product. Typically, these Internet based business ratings/review systems are provided as either the primary focus of a given website, such as a consumer watchdog or consumer report website, or as a feature of a website devoted to other purposes, such as the sale of various products and/or services or an on-line auction.

One indicator of the increasing presence, and importance, of Internet based business ratings/review systems is the fact that the number of Internet based business ratings/review systems associated with specific businesses and/or products doubled from 2006 to 2007. In addition, it is estimated that 98% of consumers now use the ratings and/or review data contained in one or more Internet based business ratings/review systems to guide their purchasing decisions. Consequently, Internet based business ratings/review systems have considerable, and seemingly ever increasing, power in both the electronic commerce and "brick and mortar" marketplaces. As a result, it is very important to all businesses, and small businesses in particular, that they maintain a positive reputation on Internet based business ratings/review systems.

In fact, recent data indicates that, on average, for every unresolved negative on-line review/rating a business receives via an Internet based business ratings/review system, that business loses 10 potential customers. In addition, over 13% of customers who are unhappy enough to submit a negative review/rating via an Internet based business ratings/review system will go on to personally tell 20 or more people about their negative experience. On the other hand, an excellent on-line reputation can not only ensure customers, or more customers, for a given business, it can also provide the business with the opportunity to charge higher prices, based in part on their historical reputation established by positive reviews/ratings, and thereby increase their profit. This is particularly true for service related businesses, but it also applies to product-based businesses, especially when the product is being purchased sight unseen over the Internet, or when warranties are involved.

As noted above, the number of Internet based business ratings/review systems is constantly growing. Therefore, despite the importance of maintaining a positive on-line reputation, as discussed above, it is often too difficult for a given business owner/manager, and particularly a small business owner, to find the time and/or other resources, to monitor the on-line reputation of their business, as established on multiple, and often unknown and ever changing websites having Internet based business ratings/review systems. Indeed, some small business owners are not even aware of the number of Internet based business ratings/review systems or even that they have an on-line reputation.

In addition, even in the case where a business owner/manager does find the time and/or other resources, to monitor the on-line reputation of the business, it is typically done on a low priority and/or "as-time permits" basis. As a result, in many cases, a significant amount of time can pass between when the on-line reputation of a business is threatened and when the business owner/manager is actually made aware of the situation.

This time lapse between when a negative review/rating is submitted and when the business owner/manager becomes aware of the negative review/rating is problematic for at least three reasons. First, as noted above, for every unresolved negative on-line review/rating a business receives, that business loses 10 potential customers and over 13% of customers who are unhappy enough to submit a negative review/rating will go on to personally tell 20 or more people about their negative experience. Consequently, it is in the business' best interest to become aware of, and/or respond to, a negative on-line review/rating as soon as possible, preferably before the negative review/rating can do any damage and/or the unhappy customer can spread the news. Second, in 95% of the cases where the issues giving rise to the negative on-line review/rating are addressed by the business quickly, and fairly, the customer is willing to use the business again, i.e., the customer remains a customer of the business. Third, a negative review/rating is often the first indication a business owner or manger has that a given practice is problematic, or that a given incident has occurred. Consequently, a negative review/rating can serve as constructive criticism regarding a given business practice that often should be addressed/modified as soon as possible.

In addition, even in the cases where a business owner/manager does find the time and/or other resources to monitor their on-line reputation, currently the business owner/manager is still not provided with any guidance regarding how to improve, or maintain, and/or establish the on-line reputation of their business or any mechanism for taking action.

As a result of the current situation discussed above, many businesses lose significant numbers of customers, and/or potential customers, every day because they lack accurate and/or up-to-date data regarding the on-line reputation of their businesses.

SUMMARY

In accordance with one embodiment, a method and apparatus for providing an on-line reputation manager includes a process for providing an on-line reputation manager whereby, in one embodiment, review and/or ratings data associated with a given business and/or product is obtained from two or more Internet based business ratings/review system sources. In one embodiment, the review and/or ratings data is aggregated, and/or standardized, and/or categorized, and/or otherwise processed, according to one or more aggregation parameters. In one embodiment, the aggregated, and/or processed, review and/or ratings data is then provided to an owner, manager, and/or agent of the given business, in one embodiment automatically. In one embodiment, the review and/or ratings data is updated periodically and/or on the occurrence of specified trigger events. In one embodiment, the aggregated, and/or processed, review and/or ratings data is provided to the an owner, manager, and/or agent of the given business informing the owner, manager, and/or agent of the given business of the business' ratings and/or overall/aggregated rating score based on the aggregated, and/or processed review and/or ratings data. In one embodiment, the owner, manager, and/or agent of the given business is also alerted to any change in the business' ratings and/or overall/aggregated rating score, and/or any specific negative review and/or ratings data received, within a specified time of the change in the data and/or the receipt of any negative review and/or ratings data. In one embodiment, the owner, manager, and/or agent of the given business is also provided general advice on how to address a given negative review and/or rating and, in one embodiment, a mechanism for resolving the issue. In embodiment, the ranking of the given business with respect to other similar businesses is also provided to the owner, manager, and/or agent of the given business.

In one embodiment the review and/or ratings data associated with the given business and/or product is obtained from one or more Internet based business ratings/review system sources found via a search engine and a Network search for items including the given business' and/or product's name or other search parameter.

In one embodiment the review and/or ratings data associated with the given business and/or product is obtained from one or more Internet based business ratings/review system sources that are dedicated review and/or ratings forum websites such as, but not limited to: YELP!, EPINIONS, CHOWHOUND, ANGIE'S LIST, TRIP ADVISOR, MY HUCKLEBERRY, ZAGAT, CITY SEARCH, JUDY'S BOOK, IGOUGO, PISSED CONSUMER, or any other website and/or network location that is a dedicated, or includes, a consumer review and/or ratings forum.

In one embodiment the review and/or ratings data associated with the given business and/or product is obtained from one or more Internet based business ratings/review system sources that are associated with, and/or are part of, a given website that is not a dedicated review and/or ratings forum website such as, but not limited to: a retailer website; an Internet warehouse website; a product and/or service website; a product and/or service provider website; a product and/or service producer's website; an Internet auction website; a community-based website; a social interaction website; or any other website including a review and/or ratings mechanism.

In one embodiment the review and/or ratings data associated with the given business and/or product is obtained from one or more Internet based business ratings/review systems by accessing one or more websites offering, or otherwise associated with, the Internet based business ratings/review systems.

In one embodiment the review and/or ratings data associated with the given business and/or product is obtained from one or more Internet based business ratings/review systems by accessing any database, computing system, and/or a server system, or any web-site or other web-based system, associated with the Internet based business ratings/review systems.

In one embodiment the review and/or ratings data associated with the given business and/or product is obtained from one or more Internet based business ratings/review systems using a computer program product as discussed herein.

In one embodiment the review and/or ratings data associated with a given business and/or product is obtained from one or more Internet based business ratings/review systems using screen scraping technology, or a similar technology.

In one embodiment the review and/or ratings data associated with the given business and/or product is obtained from one or more Internet based business ratings/review systems through, and/or from, a computing system implemented data management system that is a parent system for, implements, and/or is otherwise associated with, the process for providing an on-line reputation manager.

In one embodiment the review and/or ratings data associated with the given business and/or product is obtained from one or more Internet based business ratings/review systems through any network of computing systems and/or server systems that is comprised of multiple different computers, wireless devices, cellular telephones, digital telephones, two-way pagers, personal digital assistants, server computers, or any desired combination of these devices, that are interconnected using a network.

In one embodiment the review and/or ratings data associated with the given business and/or product is obtained from one or more Internet based business ratings/review systems through e-mail or through text messaging.

In one embodiment the review and/or ratings data associated with the given business and/or product is obtained from any two or more business ratings/review systems using any method, apparatus, process, or mechanism for obtaining data, and/or for transferring data, images, screen displays, and/or text from one or more devices, computing systems, server systems, databases, web site/web functions and/or any systems to one or more other devices, computing systems, server systems, databases, web site/web functions and/or any systems, whether known at the time of filing or as thereafter developed.

In one embodiment, once the review and/or ratings data associated with the given business and/or product is obtained from two or more Internet based business ratings/review systems is obtained, the data is stored in a data storage device such as any main memory or mass memory associated with a computing system, in any server system, in any database, or on/in computer readable medium, website, and/or any other computer program product, as defined herein. In one embodiment, the data, in whole, or in part, is stored on a webpage or in a web-based system, or any other data storage system, or by any other data storage method, discussed herein, and/or known in the art at the time of filing, and/or as developed after the time of filing.

In one embodiment, the review and/or ratings data is aggregated, and/or standardized, and/or categorized according to one or more aggregation parameters established by the provider of the process for providing an on-line reputation manager. In one embodiment, the review and/or ratings data is aggregated, and/or standardized, and/or categorized according to one or more aggregation parameters established by the user of the process for providing an on-line reputation manager, i.e., in one embodiment, the business owner/manager.

In one embodiment, the review and/or ratings data is aggregated as a collection of reviews and/or ratings from the two or more Internet based business ratings/review systems. In one embodiment, the review and/or ratings data is aggregated and then the data is standardized to accommodate and translate the different ratings and/or ranking scales used by the two or more Internet based business ratings/review systems into a single ranking/rating system. In one embodiment, the review and/or ratings data is aggregated and then the data is categorized according to one or more categories used by the two or more Internet based business ratings/review systems and/or the process for providing an on-line reputation manager. In one embodiment, the review and/or ratings data is aggregated and then processed in any manner desired by the provider of the process for providing an on-line reputation manager and/or the user owner, manager, and/or agent of the given business.

In one embodiment, the aggregated, standardized, categorized, and/or otherwise processed, review and/or ratings data is then stored in a data storage device such any other data storage device and/or method, discussed herein, and/or known in the art at the time of filing, and/or as developed after the time of filing.

In one embodiment, the aggregated, standardized, categorized, and/or otherwise processed, review and/or ratings data is then provided to an owner, manager, and/or agent of the given business, herein also referred to an the owner/manager. In one embodiment, the aggregated, standardized, categorized, and/or otherwise processed, review and/or ratings data is provided to the owner/manager of the given business automatically.

In one embodiment, the aggregated, standardized, categorized, and/or otherwise processed, review and/or ratings data is automatically updated and/or provided to the owner/manager of the given business periodically, such as on an hourly, daily, weekly, monthly, or quarterly basis.

In one embodiment, the aggregated, standardized, categorized, and/or otherwise processed, review and/or ratings data is automatically updated and provided to the owner/manager of the given business whenever the aggregated, standardized, categorized, and/or otherwise processed, review and/or ratings data changes by a specified amount. In one embodiment, the aggregated, standardized, categorized, and/or otherwise processed, review and/or ratings data is automatically updated and provided to the owner/manager of the given business whenever the data changes by a specified threshold amount and/or in a specified direction.

In one embodiment, the aggregated, standardized, categorized, and/or otherwise processed, review and/or ratings data is automatically updated and provided to the owner/manager of the given business whenever the data indicates a negative rating and/or review or a rating and/or review below a defined threshold value.

In one embodiment, the owner/manager of the given business is alerted whenever the data indicates a negative rating and/or review or a rating and/or review below a defined threshold value.

In one embodiment, the aggregated, standardized, categorized, and/or otherwise processed, review and/or ratings data is provided to the owner/manager of the given business informing the owner/manager of the given business of the overall rating score for the given business based on the aggregated, standardized, and/or categorized review and/or ratings data.

In one embodiment, the aggregated, standardized, categorized, and/or otherwise processed, review and/or ratings data is provided to the owner/manager of the given business informing the owner/manager of the given business of the business' overall rating score based on the aggregated, standardized, and/or categorized review and/or ratings data and the given business's overall rating score is compared with the overall rating score for other specified businesses. In one embodiment, the given business is ranked based on the business' overall rating score as compared with the overall rating score for other specified businesses.

In one embodiment, the aggregated, standardized, categorized, and/or otherwise processed, review and/or ratings data provided to the owner/manager of the given business includes all, or a subset, of the specific reviews and/or rating submitted about the given business from the two or more Internet based business ratings/review systems.

In one embodiment, the aggregated, standardized, categorized, and/or otherwise processed, review and/or ratings data is provided to the owner/manager of the given business by providing a owner/manager of the given business access to one or more websites.

In one embodiment, the aggregated, standardized, categorized, and/or otherwise processed, review and/or ratings data is provided to the owner/manager of the given business by providing an owner/manager of the given business access to any database, computing system, and/or a server system, or any web-site or other web-based system, associated with the process for providing an on-line reputation manager.

In one embodiment, the aggregated, standardized, categorized, and/or otherwise processed, review and/or ratings data is provided to the owner/manager of the given business using a computer program product as discussed herein.

In one embodiment, the aggregated, standardized, categorized, and/or otherwise processed, review and/or ratings data is provided to the owner/manager of the given business through, and/or from, a computing system implemented data management system that is a parent system for, implements, and/or is otherwise associated with, the process for providing an on-line reputation manager.

In one embodiment, the aggregated, standardized, categorized, and/or otherwise processed, review and/or ratings data is provided to the owner/manager of the given business through any network of computing systems and/or server systems that is comprised of multiple different computers, wireless devices, cellular telephones, digital telephones, two-way pagers, personal digital assistants, server computers, or any desired combination of these devices, that are interconnected using a network.

In one embodiment, the aggregated, standardized, categorized, and/or otherwise processed, review and/or ratings data is provided to the owner/manager of the given business through e-mail or through text messaging.

In one embodiment, the aggregated, standardized, categorized, and/or otherwise processed, review and/or ratings data is provided to the owner/manager of the given business through traditional postal service and/or traditional phone service.

In one embodiment, the aggregated, standardized, categorized, and/or otherwise processed, review and/or ratings data is provided to the owner/manager of the given business using any method, apparatus, process, or mechanism for obtaining data, and/or for transferring data, images, screen displays, and/or text from one or more devices, computing systems, server systems, databases, web site/web functions and/or any systems to one or more other devices, computing systems, server systems, databases, web site/web functions and/or any systems, whether known at the time of filing or as thereafter developed.

In one embodiment, the aggregated, standardized, categorized, and/or otherwise processed, review and/or ratings data is displayed on any display device discussed herein, and/or known in the art at the time of filing, and/or as developed after the time of filing. In one embodiment, the display device is associated with any computing system discussed herein, and/or known in the art at the time of filing, and/or as developed after the time of filing.

In one embodiment, the owner/manager of the given business is also provided advice on how to address a given negative review and/or rating and/or how to improve the overall rating of the business. In one embodiment, the owner/manager of the given business is also provided a mechanism for addressing a given negative review and/or rating such as an e-mail link to the reviewer and/or any other grievance response mechanism such as a separate section of a website.

In addition, as discussed in more detail below, using the below embodiments, with little or no modification and/or user input, there is considerable flexibility, adaptability, and opportunity for customization to meet the specific needs of various user's under numerous circumstances.

BRIEF DESCRIPTION OF THE DRAWINGS

FIG. 3 shows one example of a ratings notification in accordance with one embodiment.

Figure 1:
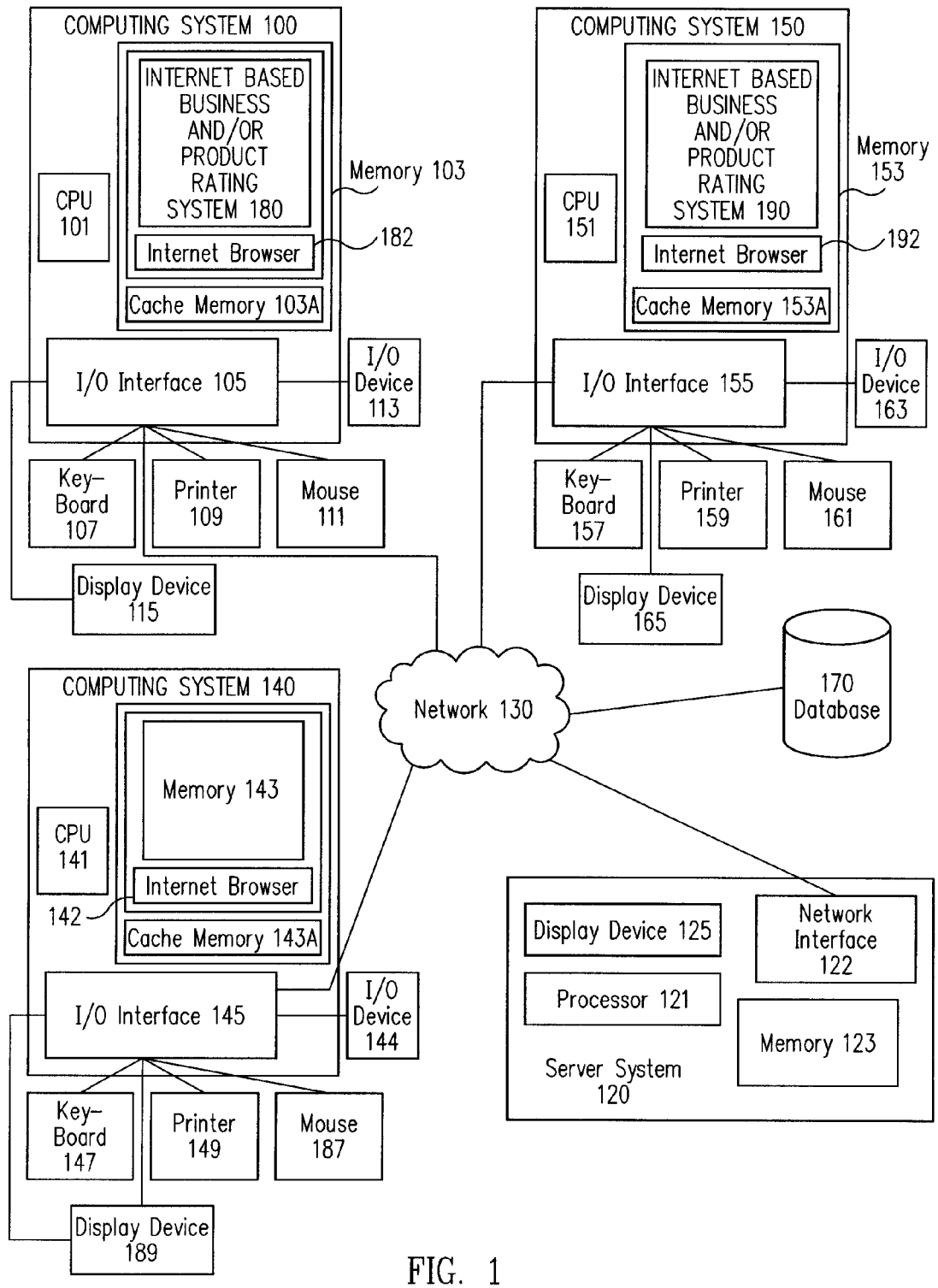
FIG. 1 is a block diagram of an exemplary hardware architecture for implementing one embodiment.

Common reference numerals are used throughout the FIGS. and the detailed description to indicate like elements. One skilled in the art will readily recognize that the above FIGS. are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIGS., which depict one or more exemplary embodiments. Embodiments may be embodied in many different forms and should not be construed as limited to the embodiments set forth herein, shown in the FIGS., and/or described below. Rather, these exemplary embodiments are provided to allow a complete disclosure that conveys the principles of the invention, as set forth in the claims, to those of skill in the art.

In accordance with one embodiment, a method and apparatus for providing an on-line reputation manager includes a process for providing an on-line reputation manager whereby, in one embodiment, review and/or ratings data associated with a given business and/or product is obtained from two or more Internet based business ratings/review system sources. In one embodiment, the review and/or ratings data is aggregated, and/or standardized, and/or categorized, and/or otherwise processed, according to one or more aggregation parameters. In one embodiment, the aggregated, and/or processed, review and/or ratings data is then provided to an owner, manager, and/or agent of the given business, in one embodiment automatically. In one embodiment, the review and/or ratings data is updated periodically and/or on the occurrence of specified trigger events. In one embodiment, the aggregated, and/or processed, review and/or ratings data is provided to the an owner, manager, and/or agent of the given business informing the owner, manager, and/or agent of the given business of the business' ratings and/or overall/aggregated rating score based on the aggregated, and/or processed review and/or ratings data. In one embodiment, the owner, manager, and/or agent of the given business is also alerted to any change in the business' ratings and/or overall/aggregated rating score, and/or any specific negative review and/or ratings data received, within a specified time of the change in the data and/or the receipt of any negative review and/or ratings data. In one embodiment, the owner, manager, and/or agent of the given business is also provided general advice on how to address a given negative review and/or rating and, in one embodiment, a mechanism for resolving the issue. In embodiment, the ranking of the given business with respect to other similar businesses is also provided to the owner, manager, and/or agent of the given business.

FIG. 1 is a block diagram of an exemplary hardware architecture for implementing one embodiment of a system and method for providing an on-line reputation manager, such as exemplary process 200 (FIG. 2) discussed herein, that, returning to FIG. 1, includes: a computing system 100, e.g., a first computing system; a computing system 150, e.g., a second computing system; a computing system 140, e.g., a third computing system; a server system 120; and a database 170, all operatively coupled by a network 130.

As seen in FIG. 1, computing system 100 typically includes a central processing unit (CPU) 101, an input/output (I/O) interface 105, and a memory system 103, including cache memory 103A. In one embodiment, memory system 103 includes all, or part, of a first Internet based business and/or product rating system 180, such as discussed herein, and/or known in the art at the time of filing, and/or as developed after the time of filing. In one embodiment, Internet based business and/or product rating system 180 is stored, in whole, or in part, in memory system 103, and is used by, or includes, or is accessed by, a process for providing an on-line reputation manager (not shown in FIG. 1, see FIG. 2).

Returning to FIG. 1, computing system 100 may further include standard user interface devices such as a keyboard 107, a mouse 111, a printer 109, and a display device 115, as well as, one or more standard input/output (I/O) devices 113, such as a compact disk (CD) or Digital Video Disc (DVD) drive, floppy disk drive, or other digital or waveform port, or other device capable of inputting data to, and outputting data from, computing system 100, whether available or known at the time of filing or as later developed. As discussed in more detail below, in one embodiment, all, or part of, a process for providing an on-line reputation manager, and/or an Internet based business and/or product rating system, are entered, in whole, or in part, into computing system 100 via I/O device 113, such as from a CD, DVD, floppy disk, portable hard drive, memory stick, download site, or other medium and/or computer program product as defined herein.

In one embodiment, computing system 100 also includes an Internet browser capability 182 that, in one embodiment, includes a search engine (not shown) and is stored, in whole, or in part in memory 103.

In one embodiment, data associated one or more Internet based business and/or product rating systems, and/or a user business is stored, in whole, or in part, in memory system 103, and is used by, or is accessed by, a process for providing an on-line reputation manager and/or one or more users. In one embodiment, computing system 100 is a computing system accessible by one or more Internet based business and/or product rating systems and/or one or more users. In one embodiment, computing system 100 is used, and/or accessible, by another computing system, such as computing systems 150 and/or 140 (discussed below).

Computing system 100 can be any computing system as defined herein and/or as known in the art at the time of filing and/or as developed thereafter, that includes components that can execute all, or part, of a process for providing an on-line reputation manager, and/or an Internet based business and/or product rating system, in accordance with at least one of the embodiments as described herein.

As also seen in FIG. 1, computing system 150 typically includes a central processing unit (CPU) 151, an input/output (I/O) interface 155, and a memory system 153, including cache memory 153A. In one embodiment, memory system 153 includes all, or part, of a second Internet based business and/or product rating system 190, such as any Internet based business and/or product rating system discussed herein, known in the art at the time of filing, and/or as developed thereafter. In one embodiment, Internet based business and/or product rating system 190 is stored, in whole, or in part, in memory system 153, and is used by, or includes, or is accessed by, and/or is otherwise associated with a process for providing an on-line reputation manager (not shown in FIG. 1, see FIG. 2).

Returning to FIG. 1, computing system 150 may further include standard user interface devices such as a keyboard 157, a mouse 161, a printer 159, and a display device 165, as well as, one or more standard input/output (I/O) devices 163, such as a compact disk (CD) or Digital Video Disc (DVD) drive, floppy disk drive, or other digital or waveform port, or other device capable of inputting data to, and outputting data from, computing system 150, whether available or known at the time of filing or as later developed. As discussed in more detail below, in one embodiment, all, or part of, a process for providing an on-line reputation manager, and/or an Internet based business and/or product rating system, are entered, in whole, or in part, into computing system 150 via I/O device 163, such as from a CD, DVD, floppy disk, portable hard drive, memory stick, download site, or other medium and/or computer program product as defined herein.

In one embodiment, computing system 150 also includes an Internet browser capability 192 that, in one embodiment, includes a search engine (not shown) and is stored, in whole, or in part in memory 153.

In one embodiment, data associated one or more Internet based business and/or product rating systems and/or a user business is stored, in whole, or in part, in memory system 153, and is used by, or is accessed by, a process for providing an on-line reputation manager and/or one or more users. In one embodiment, computing system 150 is a computing system accessible by one or more Internet based business and/or product rating systems and/or one or more users. In one embodiment, computing system 150 is used, and/or accessible, by another computing system, such as computing systems 100 and/or 140 (discussed below).

Computing system 150 can be any computing system as defined herein and/or as known in the art at the time of filing and/or as developed thereafter, that includes components that can execute all, or part, of a process for providing an on-line reputation manager, and/or an Internet based business and/or product rating system, in accordance with at least one of the embodiments as described herein.

As also seen in FIG. 1, computing system 140 typically includes a central processing unit (CPU) 141, an input/output (I/O) interface 145, and a memory system 143, including cache memory 143A.

Returning to FIG. 1, computing system 140 may further include standard user interface devices such as a keyboard 147, a mouse 187, a printer 149, and a display device 189, as well as, one or more standard input/output (I/O) devices 144, such as a compact disk (CD) or Digital Video Disc (DVD) drive, floppy disk drive, or other digital or waveform port, or other device capable of inputting data to, and outputting data from, computing system 140, whether available or known at the time of filing or as later developed. As discussed in more detail below, in one embodiment, a process for providing an on-line reputation manager, and/or an Internet based business and/or product rating system, are entered, in whole, or in part, into computing system 140 via I/O device 144, such as from a CD, DVD, floppy disk, portable hard drive, memory stick, download site, or other medium and/or computer program product as defined herein.

In one embodiment, computing system 140 also includes an Internet browser capability 142 that, in one embodiment, includes a search engine (not shown) and is stored, in whole, or in part in memory 143.

In one embodiment, data associated with a process for providing an on-line reputation manager and/or one or more Internet based business and/or product rating systems and/or one or more user businesses, is stored, in whole, or in part, in memory system 143. In one embodiment, computing system 140 is a computing system accessible by one or more business owners/managers and/or other users. In one embodiment, computing system 140 is used, and/or accessible, by another computing system, such as computing systems 150 and/or 100.

Computing system 140 can be any computing system as defined herein and/or as known in the art at the time of filing and/or as developed thereafter, that includes components that can execute all, or part, of a process for providing an on-line reputation manager, and/or an Internet based business and/or product rating system, in accordance with at least one of the embodiments as described herein.

Also shown in FIG. 1 is database 170. In one embodiment, database 170 is a data storage device, a designated server system or computing system, or a designated portion of one or more server systems or computing systems, such as computing systems 100, 140, 150 and server system 120, or a distributed database, or an external and/or portable hard drive. In one embodiment, database 170 is a dedicated mass storage device implemented in software, hardware, or a combination of hardware and software. In one embodiment, database 170 includes a web-based function. As discussed in more detail below, in one embodiment, database 170 is under the control of, or otherwise accessible by, a process for providing an on-line reputation manager, and/or an Internet based business and/or product rating system.

In one embodiment, data associated with one or more Internet based business and/or product rating systems and/or user businesses, is stored, in whole, or in part, in database 170, and is used by, or is accessed by, a process for providing an on-line reputation manager. In one embodiment, database 170 is accessible by one or more one or more business owners/managers, providers of one or more Internet based business and/or product rating systems, and/or other users. In one embodiment, database 170 is used, and/or accessible, by a computing system, such as computing systems 100, 140, and/or 150, and/or a server system, such as sever system 120 (discussed below).

In one embodiment, computing systems 100, 140, and 150, and database 170, are coupled to a server system 120 through network 130. In one embodiment, server system 120 includes a server system display device 125, a server system processor 121, a server system memory 123, and a server system network interface 122.

In one embodiment, server system 120 is used in a station-to-station arrangement, such as a peer-to-peer, or hybrid peer-to peer, arrangement, as an indexing and/or central server used to connect a first computing system, such as computing system 100, and a second computing system, such as computing system 150.

In one embodiment, data associated with one or more Internet based business and/or product rating systems and/or data associated with one or more user businesses is stored, in whole, or in part, in server system 120, and is used by, or is accessed by, a process for providing an on-line reputation manager. In one embodiment, server system 120 is accessible by one or more users. In one embodiment, server system 120 is used, and/or accessible, by a computing system, such as computing systems 100, 140, and/or 150, and/or one or more databases, such as database 170.

Network 130 can be any network or network system as defined herein, and/or known in the art at the time of filing, and/or as developed after the time of filing, capable of allowing communication between two or more computing systems, server systems, and/or databases.

Those of skill in the art will readily recognize that the components shown in FIG. 1, such as computing systems 100, 140, and 150, database 170, server system 120, and their respective components, are shown for illustrative purposes only and that architectures with more or fewer components can implement, and benefit from, one or more embodiments. Moreover, one or more components of computing system 100, computing system 140, computing system 150, database 170, and server system 120 may be located remotely from their respective system and accessed via network 130. In addition, the particular type of, and configuration of, computing systems 100, 140, and 150, database 170, and server system 120 is not relevant.

As discussed in more detail below, in one embodiment, a process for providing an on-line reputation manager, and/or one or more Internet based business and/or product rating systems, and/or data associated with one or more user businesses, is stored, in whole, or in part, in memory system 103 and/or cache memory 103A, of computing system 100, in memory system 143 and/or cache memory 143A, of computing system 140, and/or memory system 153 and/or cache memory 153A of computing system 150, and/or in server memory system 123 of server system 120 and/or in database 170, and executed on computing system 100, and/or computing system 140, and/or computing system 150. As used herein, a memory refers to a volatile memory, a non-volatile memory, or any combination of the two.

Although a process for providing an on-line reputation manager is at times referred to herein, alternatively, as a process, an application, a module, a program, a component of a software system, a component of a software package, a component of a parent system, a plug-in, or a feature of a parent system, this terminology is illustrative only. In some embodiments, a process for providing an on-line reputation manager is capable of being called from an application or the operating system. In one embodiment, an application, process, or program is generally defined to be any executable code. Moreover, those of skill in the art will understand that when it is said that an application, process, or an operation takes some action, the action is the result of executing one or more instructions by a processor, such as CPUs 101, 141, and 150, or server system processor 121. In one embodiment, execution of a process by CPU 101, CPU 141, CPU 150, or server system processor 121, results in the operations of an agent computer process (not shown) and/or a rule computer process (not shown).

In one embodiment, a process for providing an on-line reputation manager, and/or one or more Internet based business and/or product rating systems, and/or data associated with one or more user businesses, are computer applications or processes and/or data implemented and/or run and/or stored, in full, or in part, in, or on, and/or through, a computer program product. Herein, a computer program product comprises a medium and/or I/O device configured to store or transport computer readable code, whether available or known at the time of filing or as later developed. Some examples of computer program products are CDs, DVDs, ROM cards, floppy discs, magnetic tapes, computer hard drives, portable hard drives, flash memory, volatile and non-volatile memory sticks, servers on a network, such as server system 120 of FIG. 1, and signals transmitted over a network, such as network 130 of FIG. 1, or other media or process capable of delivering computer readable data representing computer readable code, whether available or known at the time of filing or as later developed. This medium may belong to a computing system, such as computing systems 100 and 150 of FIG. 1, described above. However, in some embodiments, the medium also may be removable and/or remote from the computing system.

Process

Herein, the terms "user" and "user business" and "business" include any person, party, business, system, application, organization, and/or entity interacting with, interfacing with, contacting, viewing, accepting data from, requesting data from, and/or otherwise associating with the process for providing an on-line reputation manager for any purpose.

As used herein, the term "computing system", includes, but is not limited to: a portable computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

As used herein, the terms "Internet based business ratings/review system", "Internet based business and/or product review system", "Internet based business and/or product rating system", and "Internet based business and/or product review and/or rating system" are used interchangeable and includes, but are not limited to any system, subsystem, package, program, module, web-function, or application that provides a review forum, and/or ratings system, and/or recommendation service, whereby various parties can share their opinions of a given business and/or product with other potential consumers of the business and/or product.

As used herein, the term "computing system implemented data management system" includes, but is not limited to: computing system implemented accounting and/or invoicing systems, packages, programs, modules, or applications; computing system implemented financial management systems, packages, programs, modules, or applications; computing system implemented online account management systems, packages, programs, modules, or applications; computing system implemented banking systems, packages, programs, modules, or applications; computing system implemented personal and small business financial management systems, packages, programs, modules, or applications; computing system implemented business systems, packages, programs, modules, or applications; computing system implemented marketing device distribution systems, packages, programs, modules, or applications; computing system implemented financial institution financial management systems, packages, programs, modules, or applications; computing system implemented tax preparation systems, packages, programs, modules, or applications; computing system implemented business and/or point of sale systems, packages, programs, modules, or applications; computing system implemented healthcare management systems, packages, programs, modules, or applications and various other electronic data driven data management systems, packages, programs, modules, or applications, whether known at the time of filling or as developed later.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, a combination of different network types, or other wireless, wired, and/or a wireless and wired combination network capable of allowing communication between two or more computing systems, whether available or known at the time of filing or as later developed.

As used herein, the term "database" includes, but is not limited to, any data storage mechanism known at the time of filing or as developed thereafter, such as, but not limited to: a data storage device; a designated server system or computing system, or a designated portion of one or more server systems or computing systems; a mobile computing system; a server system network; a distributed database; or an external and/or portable hard drive. Herein, the term "database" can refer to a dedicated mass storage device implemented in software, hardware, or a combination of hardware and software. Herein, the term "database" can refer to a web-based function. Herein, the term "database" can refer to any data storage means that is part of, or under the control of, any computing system, as defined herein, known at the time of filing, or as developed thereafter.

In accordance with one embodiment, a method and apparatus for providing an on-line reputation manager includes a process for providing an on-line reputation manager whereby, in one embodiment, review and/or ratings data associated with a given business and/or product is obtained from two or more Internet based business ratings/review system sources. In one embodiment, the review and/or ratings data is aggregated, and/or standardized, and/or categorized, and/or otherwise processed, according to one or more aggregation parameters. In one embodiment, the aggregated, and/or processed, review and/or ratings data is then provided to an owner, manager, and/or agent of the given business, in one embodiment automatically. In one embodiment, the review and/or ratings data is updated periodically and/or on the occurrence of specified trigger events. In one embodiment, the aggregated, and/or processed, review and/or ratings data is provided to the an owner, manager, and/or agent of the given business informing the owner, manager, and/or agent of the given business of the business' ratings and/or overall/aggregated rating score based on the aggregated, and/or processed review and/or ratings data. In one embodiment, the owner, manager, and/or agent of the given business is also alerted to any change in the business' ratings and/or overall/aggregated rating score, and/or any specific negative review and/or ratings data received, within a specified time of the change in the data and/or the receipt of any negative review and/or ratings data. In one embodiment, the owner, manager, and/or agent of the given business is also provided general advice on how to address a given negative review and/or rating and, in one embodiment, a mechanism for resolving the issue. In embodiment, the ranking of the given business with respect to other similar businesses is also provided to the owner, manager, and/or agent of the given business.

Figure 2:
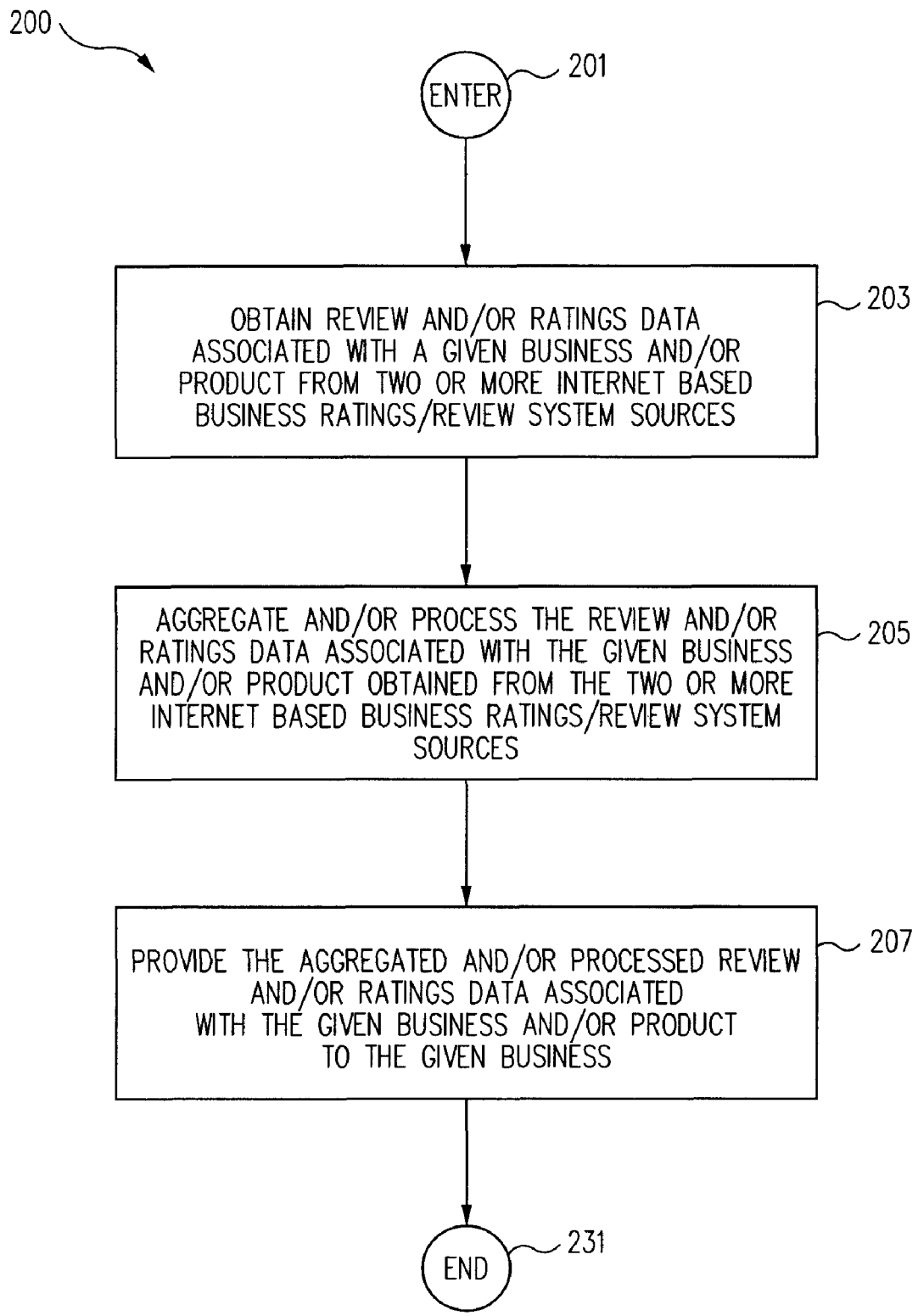
FIG. 2 is a flow chart depicting a process for providing an on-line reputation manager in accordance with one embodiment.

FIG. 2 is a flow chart depicting a process for providing an on-line reputation manager 200 in accordance with one embodiment. Process for providing an on-line reputation manager 200 begins at ENTER OPERATION 201 and process flow proceeds to OBTAIN REVIEW AND/OR RATINGS DATA ASSOCIATED WITH A GIVEN BUSINESS AND/OR PRODUCT FROM TWO OR MORE INTERNET BASED BUSINESS RATINGS/REVIEW SYSTEM SOURCES OPERATION 203.

In one embodiment, at OBTAIN REVIEW AND/OR RATINGS DATA ASSOCIATED WITH A GIVEN BUSINESS AND/OR PRODUCT FROM TWO OR MORE INTERNET BASED BUSINESS RATINGS/REVIEW SYSTEM SOURCES OPERATION 203 review and/or ratings data associated with a given business and/or product is obtained from two or more Internet based business ratings/review system sources.

In one embodiment, at OBTAIN REVIEW AND/OR RATINGS DATA ASSOCIATED WITH A GIVEN BUSINESS AND/OR PRODUCT FROM TWO OR MORE INTERNET BASED BUSINESS RATINGS/REVIEW SYSTEM SOURCES OPERATION 203 the review and/or ratings data associated with the given business and/or product is obtained from one or more Internet based business ratings/review system sources found via a search engine and/or a Internet browser, such as Internet browsers 182, 192 and/or 142 of FIG. 1, and a network search for items including the given business' and/or product's name or other search parameter/key word.

In one embodiment the review and/or ratings data associated with the given business and/or product is obtained at OBTAIN REVIEW AND/OR RATINGS DATA ASSOCIATED WITH A GIVEN BUSINESS AND/OR PRODUCT FROM TWO OR MORE INTERNET BASED or more Internet based business ratings/review system sources that are dedicated review and/or ratings forum websites such as, but not limited to: YELP!, EPINIONS, CHOWHOUND, or any other website that is a dedicated consumer review and/or ratings forum.

In one embodiment the review and/or ratings data associated with the given business and/or product is obtained at OBTAIN REVIEW AND/OR RATINGS DATA ASSOCIATED WITH A GIVEN BUSINESS AND/OR PRODUCT FROM TWO OR MORE INTERNET BASED BUSINESS RATINGS/REVIEW SYSTEM SOURCES OPERATION 203 from one or more Internet based business ratings/review system sources that are associated with, and/or are part of, a given website that is not a dedicated review and/or ratings forum website such as, but not limited to, a retailer website, an Internet warehouse, an Internet auction site, a consumer watchdog site, or any other website including a review and/or ratings mechanism.

In one embodiment, the review and/or ratings data associated with a given business and/or product obtained from two or more Internet based business ratings/review system sources at OBTAIN REVIEW AND/OR RATINGS DATA ASSOCIATED WITH A GIVEN BUSINESS AND/OR PRODUCT FROM TWO OR MORE INTERNET BASED BUSINESS RATINGS/REVIEW SYSTEM SOURCES OPERATION 203 includes, but is not limited to: data representing one or more individual reviewer's ratings and/or reviews of the given business and/or product; data representing the average of accumulated individual reviewer ratings for the given business and/or product; data representing virtually any discrete symbol or symbols used to rate the given business and/or product; data representing text and/or comments, or any portion thereof, submitted by one or more reviewers of the given business and/or product; and/or any other review and/or ratings data associated with a given business and/or product desired and/or available.

In addition, in one embodiment, the review and/or ratings data associated with a given business and/or product obtained from two or more Internet based business ratings/review system sources at OBTAIN REVIEW AND/OR RATINGS DATA ASSOCIATED WITH A GIVEN BUSINESS AND/OR PRODUCT FROM TWO OR MORE INTERNET BASED BUSINESS RATINGS/REVIEW SYSTEM SOURCES OPERATION 203 includes data representing any singular symbol or graphical display capable of visually representing an individual reviewer's rating and/or the average of accumulated individual reviewer ratings. As an example, a thermometer, a sliding scale, any graphical representation, or any partially filed figure or symbol, or outline thereof may be used. Moreover, these symbols, graphical displays, and scales may, in some embodiments, display either an individual reviewer's level of satisfaction or dissatisfaction and/or the average of the accumulated individual reviewer's satisfaction or dissatisfaction.

Internet based business ratings/review systems, as well as methods and apparatuses for implementing Internet based business ratings/review systems, are well-known to those of skill in the art. Consequently, a more detailed discussion of Internet based business ratings/review systems, as well as methods and apparatuses for implementing Internet based business ratings/review systems is omitted here to avoid detracting from the invention.

In one embodiment, the review and/or ratings data associated with the given business and/or product is obtained at OBTAIN REVIEW AND/OR RATINGS DATA ASSOCIATED WITH A GIVEN BUSINESS AND/OR PRODUCT FROM TWO OR MORE INTERNET BASED BUSINESS RATINGS/REVIEW SYSTEM SOURCES OPERATION 203 from one or more Internet based business ratings/review systems by accessing one or more websites offering, or otherwise associated with, the Internet based business ratings/review systems.

In one embodiment, the review and/or ratings data associated with the given business and/or product is obtained at OBTAIN REVIEW AND/OR RATINGS DATA ASSOCIATED WITH A GIVEN BUSINESS AND/OR PRODUCT FROM TWO OR MORE INTERNET BASED BUSINESS RATINGS/REVIEW SYSTEM SOURCES OPERATION 203 from one or more Internet based business ratings/review systems by accessing any database, such as database 170 of FIG. 1, associated with the Internet based business ratings/review systems.

Returning to FIG. 2, in one embodiment, the review and/or ratings data associated with the given business and/or product is obtained at OBTAIN REVIEW AND/OR RATINGS DATA ASSOCIATED WITH A GIVEN BUSINESS AND/OR PRODUCT FROM TWO OR MORE INTERNET BASED BUSINESS RATINGS/REVIEW SYSTEM SOURCES OPERATION 203 from one or more Internet based business ratings/review systems by accessing any computing system, such as computing systems 100 and/or 150 of FIG. 1, associated with the Internet based business ratings/review systems.

Returning to FIG. 2, in one embodiment, the review and/or ratings data associated with the given business and/or product is obtained at OBTAIN REVIEW AND/OR RATINGS DATA ASSOCIATED WITH A GIVEN BUSINESS AND/OR PRODUCT FROM TWO OR MORE INTERNET BASED BUSINESS RATINGS/REVIEW SYSTEM SOURCES OPERATION 203 from one or more Internet based business ratings/review systems by accessing any server system, such as server system 120 of FIG. 1, associated with the Internet based business ratings/review systems.

Returning to FIG. 2, in one embodiment, the review and/or ratings data associated with the given business and/or product is obtained at OBTAIN REVIEW AND/OR RATINGS DATA ASSOCIATED WITH A GIVEN BUSINESS AND/OR PRODUCT FROM TWO OR MORE INTERNET BASED BUSINESS RATINGS/REVIEW SYSTEM SOURCES OPERATION 203 from one or more Internet based business ratings/review systems by accessing any web-site or other web-based system on a network, such as network 130 of FIG. 1, associated with the Internet based business ratings/review systems.

Returning to FIG. 2, in one embodiment, the review and/or ratings data associated with the given business and/or product is obtained at OBTAIN REVIEW AND/OR RATINGS DATA ASSOCIATED WITH A GIVEN BUSINESS AND/OR PRODUCT FROM TWO OR MORE INTERNET BASED BUSINESS RATINGS/REVIEW SYSTEM SOURCES OPERATION 203 via a computer program product as discussed herein.

In one embodiment, at least part of the review and/or ratings data associated with the given business and/or product is obtained at OBTAIN REVIEW AND/OR RATINGS DATA ASSOCIATED WITH A GIVEN BUSINESS AND/OR PRODUCT FROM TWO OR MORE INTERNET BASED BUSINESS RATINGS/REVIEW SYSTEM SOURCES OPERATION 203 using screen scraping technology, or a similar technology.

In one embodiment, at least part of the review and/or ratings data associated with the given business and/or product is obtained at OBTAIN REVIEW AND/OR RATINGS DATA ASSOCIATED WITH A GIVEN BUSINESS AND/OR PRODUCT FROM TWO OR MORE INTERNET BASED BUSINESS RATINGS/REVIEW SYSTEM SOURCES OPERATION 203 through, and/or from, a computing system implemented data management system that is a parent system for, implements, and/or is otherwise associated with, process for providing an on-line reputation manager 200.

In one embodiment, at least part of the review and/or ratings data associated with the given business and/or product is obtained at OBTAIN REVIEW AND/OR RATINGS DATA ASSOCIATED WITH A GIVEN BUSINESS AND/OR PRODUCT FROM TWO OR MORE INTERNET BASED BUSINESS RATINGS/REVIEW SYSTEM SOURCES OPERATION 203 through any network of computing systems and/or server systems, such as network 130 of FIG. 1, that is comprised of multiple different computers, wireless devices, cellular telephones, digital telephones, two-way pagers, personal digital assistants, server computers, or any desired combination of these devices, that are interconnected using a network.

Returning to FIG. 2, in one embodiment, at least part of the review and/or ratings data associated with the given business and/or product is obtained at OBTAIN REVIEW AND/OR RATINGS DATA ASSOCIATED WITH A GIVEN BUSINESS AND/OR PRODUCT FROM TWO OR MORE INTERNET BASED BUSINESS RATINGS/REVIEW SYSTEM SOURCES OPERATION 203 through e-mail or through text messaging.

In other embodiments, at least part of the review and/or ratings data associated with the given business and/or product is obtained at OBTAIN REVIEW AND/OR RATINGS DATA ASSOCIATED WITH A GIVEN BUSINESS AND/OR PRODUCT FROM TWO OR MORE INTERNET BASED BUSINESS RATINGS/REVIEW SYSTEM SOURCES OPERATION 203 using any method, apparatus, process, or mechanism for obtaining data, and/or for transferring data, images, screen displays, and/or text from one or more devices, computing systems, server systems, databases, web site/web functions and/or any systems to one or more other devices, computing systems, server systems, databases, web site/web functions and/or any systems, whether known at the time of filing or as thereafter developed.

In one embodiment, the Internet based business ratings/review systems include Internet based business ratings/review system applications, such as Internet based business ratings/review systems 180 and 190 of FIG. 1. In one embodiment, one or more of the Internet based business ratings/review systems of OBTAIN REVIEW AND/OR RATINGS DATA ASSOCIATED WITH A GIVEN BUSINESS AND/OR PRODUCT FROM TWO OR MORE INTERNET BASED BUSINESS RATINGS/REVIEW SYSTEM SOURCES OPERATION 203 is/are a parent system for, and include, process for providing an on-line reputation manager 200 as a function or module. In one embodiment, process for providing an on-line reputation manager 200 is a stand alone system.

In one embodiment, at least part of the review and/or ratings data associated with the given business and/or product is obtained at OBTAIN REVIEW AND/OR RATINGS DATA ASSOCIATED WITH A GIVEN BUSINESS AND/OR PRODUCT FROM TWO OR MORE INTERNET BASED BUSINESS RATINGS/REVIEW SYSTEM SOURCES OPERATION 203 is stored, in whole, or in part, in a memory system, such as memory systems 103, 143, and 153 or server memory system 123, or database 170, of FIG. 1, or in a cache memory, such as cache memories 103A/143A/153A of FIG. 1, or in any main memory or mass memory, associated with a computing system, such as computing systems 100, 140, or 150 described above. In one embodiment, at least part of the data is stored, in whole, or in part, in any computing system and/or server system, such as computing systems 100, 140, or 150 or server system 120, or other device, in another location, or on/in a computer readable medium, and/or any other computer program product, as defined herein. In one embodiment, at least part of the data is stored, in whole, or in part, in any database, such as database 170 of FIG. 1. In one embodiment, the data is stored, in whole, or in part, on a webpage, in a web-based system on a network such as network 130 of FIG. 1. In one embodiment, at least part of the data is stored, in whole, or in part, on a webpage, in a web-based system on a public network such as the Internet.

Returning to FIG. 2, once the review and/or ratings data associated with a given business and/or product is obtained from two or more Internet based business ratings/review system sources at OBTAIN REVIEW AND/OR RATINGS DATA ASSOCIATED WITH A GIVEN BUSINESS AND/OR PRODUCT FROM TWO OR MORE INTERNET BASED BUSINESS RATINGS/REVIEW SYSTEM SOURCES OPERATION 203, process flow proceeds to AGGREGATE AND/OR PROCESS THE REVIEW AND/OR RATINGS DATA ASSOCIATED WITH THE GIVEN BUSINESS AND/OR PRODUCT OBTAINED FROM THE TWO OR MORE INTERNET BASED BUSINESS RATINGS/REVIEW SYSTEM SOURCES OPERATION 205.

In one embodiment, at AGGREGATE AND/OR PROCESS THE REVIEW AND/OR RATINGS DATA ASSOCIATED WITH THE GIVEN BUSINESS AND/OR PRODUCT OBTAINED FROM THE TWO OR MORE INTERNET BASED BUSINESS RATINGS/REVIEW SYSTEM SOURCES OPERATION 205 the review and/or ratings data of OBTAIN REVIEW AND/OR RATINGS DATA ASSOCIATED WITH A GIVEN BUSINESS AND/OR PRODUCT FROM TWO OR MORE INTERNET BASED BUSINESS RATINGS/REVIEW SYSTEM SOURCES OPERATION 203 is aggregated, and/or standardized, and/or categorized, and/or otherwise processed, according to one or more aggregation parameters.

In one embodiment, at AGGREGATE AND/OR PROCESS THE REVIEW AND/OR RATINGS DATA ASSOCIATED WITH THE GIVEN BUSINESS AND/OR PRODUCT OBTAINED FROM THE TWO OR MORE INTERNET BASED BUSINESS RATINGS/REVIEW SYSTEM SOURCES OPERATION 205 the review and/or ratings data of OBTAIN REVIEW AND/OR RATINGS DATA ASSOCIATED WITH A GIVEN BUSINESS AND/OR PRODUCT FROM TWO OR MORE INTERNET BASED BUSINESS RATINGS/REVIEW SYSTEM SOURCES OPERATION 203 is aggregated, and/or standardized, and/or categorized according to one or more aggregation parameters established by the provider of process for providing an on-line reputation manager 200.

In one embodiment, at AGGREGATE AND/OR PROCESS THE REVIEW AND/OR RATINGS DATA ASSOCIATED WITH THE GIVEN BUSINESS AND/OR PRODUCT OBTAINED FROM THE TWO OR MORE INTERNET BASED BUSINESS RATINGS/REVIEW SYSTEM SOURCES OPERATION 205 the review and/or ratings data of OBTAIN REVIEW AND/OR RATINGS DATA ASSOCIATED WITH A GIVEN BUSINESS AND/OR PRODUCT FROM TWO OR MORE INTERNET BASED BUSINESS RATINGS/REVIEW SYSTEM SOURCES OPERATION 203 is aggregated, and/or standardized, and/or categorized according to one or more aggregation parameters established and/or modified by the user of process for providing an on-line reputation manager 200, i.e., in one embodiment, the business owner/manger.

In one embodiment, at AGGREGATE AND/OR PROCESS THE REVIEW AND/OR RATINGS DATA ASSOCIATED WITH THE GIVEN BUSINESS AND/OR PRODUCT OBTAINED FROM THE TWO OR MORE INTERNET BASED BUSINESS RATINGS/REVIEW SYSTEM SOURCES OPERATION 205 the review and/or ratings data of AGGREGATE AND/OR PROCESS THE REVIEW AND/OR RATINGS DATA ASSOCIATED WITH THE GIVEN BUSINESS AND/OR PRODUCT OBTAINED FROM THE TWO OR MORE INTERNET BASED BUSINESS RATINGS/REVIEW SYSTEM SOURCES OPERATION 205 is aggregated as an unedited and/or unprocessed collection of reviews and/or ratings from the two or more Internet based business ratings/review systems.

In one embodiment, at AGGREGATE AND/OR PROCESS THE REVIEW AND/OR RATINGS DATA ASSOCIATED WITH THE GIVEN BUSINESS AND/OR PRODUCT OBTAINED FROM THE TWO OR MORE INTERNET BASED BUSINESS RATINGS/REVIEW SYSTEM SOURCES OPERATION 205 the review and/or ratings data of OBTAIN REVIEW AND/OR RATINGS DATA ASSOCIATED WITH A GIVEN BUSINESS AND/OR PRODUCT FROM TWO OR MORE INTERNET BASED BUSINESS RATINGS/REVIEW SYSTEM SOURCES OPERATION 203 is aggregated and then the data is standardized to accommodate, and/or translate/map, the different ratings and/or ranking scales and/or symbols used by the two or more Internet based business ratings/review systems of OBTAIN REVIEW AND/OR RATINGS DATA ASSOCIATED WITH A GIVEN BUSINESS AND/OR PRODUCT FROM TWO OR MORE INTERNET BASED BUSINESS RATINGS/REVIEW SYSTEM SOURCES OPERATION 203 into a single and/or uniform ranking/rating system.

In one embodiment, at AGGREGATE AND/OR PROCESS THE REVIEW AND/OR RATINGS DATA ASSOCIATED WITH THE GIVEN BUSINESS AND/OR PRODUCT OBTAINED FROM THE TWO OR MORE INTERNET BASED BUSINESS RATINGS/REVIEW SYSTEM SOURCES OPERATION 205 the review and/or ratings data of OBTAIN REVIEW AND/OR RATINGS DATA ASSOCIATED WITH A GIVEN BUSINESS AND/OR PRODUCT FROM TWO OR MORE INTERNET BASED BUSINESS RATINGS/REVIEW SYSTEM SOURCES OPERATION 203 is aggregated and then the data is categorized according to one or more categories used by the two or more Internet based business ratings/review systems and/or the process of OBTAIN REVIEW AND/OR, RATINGS DATA ASSOCIATED WITH A GIVEN BUSINESS AND/OR PRODUCT FROM TWO OR MORE INTERNET BASED BUSINESS RATINGS/REVIEW SYSTEM SOURCES OPERATION 203 into a single and/or uniform categorization system.

In one embodiment, at AGGREGATE AND/OR PROCESS THE REVIEW AND/OR RATINGS DATA ASSOCIATED WITH THE GIVEN BUSINESS AND/OR PRODUCT OBTAINED FROM THE TWO OR MORE INTERNET BASED BUSINESS RATINGS/REVIEW SYSTEM SOURCES OPERATION 205 the review and/or ratings data of OBTAIN REVIEW AND/OR RATINGS DATA ASSOCIATED WITH A GIVEN BUSINESS AND/OR PRODUCT FROM TWO OR MORE INTERNET BASED BUSINESS RATINGS/REVIEW SYSTEM SOURCES OPERATION 203 is aggregated and then processed in any manner desired by the provider of the process for providing an on-line reputation manager and/or the owner/manger of the given business.

In one embodiment, at AGGREGATE AND/OR PROCESS THE REVIEW AND/OR RATINGS DATA ASSOCIATED WITH THE GIVEN BUSINESS AND/OR PRODUCT OBTAINED FROM THE TWO OR MORE INTERNET BASED BUSINESS RATINGS/REVIEW SYSTEM SOURCES OPERATION 205 all, or part of, the review and/or ratings data of OBTAIN REVIEW AND/OR RATINGS DATA ASSOCIATED WITH A GIVEN BUSINESS AND/OR PRODUCT FROM TWO OR MORE INTERNET BASED BUSINESS RATINGS/REVIEW SYSTEM SOURCES OPERATION 203 associated with the given business are compiled along with the individual ratings of each review. In one embodiment, the individual ratings are then averaged to calculate an overall business rating for the given business.

In one embodiment, the aggregated, standardized, categorized, and/or otherwise processed, review and/or ratings data of AGGREGATE AND/OR PROCESS THE REVIEW AND/OR RATINGS DATA ASSOCIATED WITH THE GIVEN BUSINESS AND/OR PRODUCT OBTAINED FROM THE TWO OR MORE INTERNET BASED BUSINESS RATINGS/REVIEW SYSTEM SOURCES OPERATION 205 is then stored in a data storage device such any other data storage device and/or method discussed herein, and/or known in the art at the time of filing, and/or as developed after the time of filing.

In one embodiment, once the review and/or ratings data of OBTAIN REVIEW AND/OR RATINGS DATA ASSOCIATED WITH A GIVEN BUSINESS AND/OR PRODUCT FROM TWO OR MORE INTERNET BASED BUSINESS RATINGS/REVIEW SYSTEM SOURCES OPERATION 203 is aggregated, and/or standardized, and/or categorized according to one or more aggregation parameters established by the provider of process for providing an on-line reputation manager 200 at AGGREGATE AND/OR PROCESS THE REVIEW AND/OR RATINGS DATA ASSOCIATED WITH THE GIVEN BUSINESS AND/OR PRODUCT OBTAINED FROM THE TWO OR MORE INTERNET BASED BUSINESS RATINGS/REVIEW SYSTEM SOURCES OPERATION 205, process flow proceeds to PROVIDE THE AGGREGATED AND/OR PROCESSED REVIEW AND/OR RATINGS DATA ASSOCIATED WITH THE GIVEN BUSINESS AND/OR PRODUCT TO THE GIVEN BUSINESS OPERATION 207.

In one embodiment, at PROVIDE THE AGGREGATED AND/OR PROCESSED REVIEW AND/OR RATINGS DATA ASSOCIATED WITH THE GIVEN BUSINESS AND/OR PRODUCT TO THE GIVEN BUSINESS OPERATION 207 the aggregated, and/or processed, review and/or ratings data of AGGREGATE AND/OR PROCESS THE REVIEW AND/OR RATINGS DATA ASSOCIATED WITH THE GIVEN BUSINESS AND/OR PRODUCT OBTAINED FROM THE TWO OR MORE INTERNET BASED BUSINESS RATINGS/REVIEW SYSTEM SOURCES OPERATION 205 is then provided to an owner, manager, and/or agent of the given business, herein also referred to an the owner/manager.

In one embodiment, at PROVIDE THE AGGREGATED AND/OR PROCESSED REVIEW AND/OR RATINGS DATA ASSOCIATED WITH THE GIVEN BUSINESS AND/OR PRODUCT TO THE GIVEN BUSINESS OPERATION 207 the aggregated, and/or processed, review and/or ratings data of AGGREGATE AND/OR PROCESS THE REVIEW AND/OR RATINGS DATA ASSOCIATED WITH THE GIVEN BUSINESS AND/OR PRODUCT OBTAINED FROM THE TWO OR MORE INTERNET BASED BUSINESS RATINGS/REVIEW SYSTEM SOURCES OPERATION 205 is provided to an owner/manager of the given business automatically.

In one embodiment, at PROVIDE THE AGGREGATED AND/OR PROCESSED REVIEW AND/OR RATINGS DATA ASSOCIATED WITH THE GIVEN BUSINESS AND/OR PRODUCT TO THE GIVEN BUSINESS OPERATION 207 the aggregated, and/or processed, review and/or ratings data of AGGREGATE AND/OR PROCESS THE REVIEW AND/OR RATINGS DATA ASSOCIATED WITH THE GIVEN BUSINESS AND/OR PRODUCT OBTAINED FROM THE TWO OR MORE INTERNET BASED BUSINESS RATINGS/REVIEW SYSTEM SOURCES OPERATION 205 is then provided to an owner/manager of the given business and is updated periodically and/or on the occurrence of specified trigger events.

In one embodiment, at PROVIDE THE AGGREGATED AND/OR PROCESSED REVIEW AND/OR RATINGS DATA ASSOCIATED WITH THE GIVEN BUSINESS AND/OR PRODUCT TO THE GIVEN BUSINESS OPERATION 207 the aggregated, and/or processed, review and/or ratings data of AGGREGATE AND/OR PROCESS THE REVIEW AND/OR RATINGS DATA ASSOCIATED WITH THE GIVEN BUSINESS AND/OR PRODUCT OBTAINED FROM THE TWO OR MORE INTERNET BASED BUSINESS RATINGS/REVIEW SYSTEM SOURCES OPERATION 205 is automatically provided to the owner/manager of the given business periodically, such as on an hourly, daily, weekly, monthly, or quarterly basis.

In one embodiment, at PROVIDE THE AGGREGATED AND/OR PROCESSED REVIEW AND/OR RATINGS DATA ASSOCIATED WITH THE GIVEN BUSINESS AND/OR PRODUCT TO THE GIVEN BUSINESS OPERATION 207 the aggregated, and/or processed, review and/or ratings data of AGGREGATE AND/OR PROCESS THE REVIEW AND/OR RATINGS DATA ASSOCIATED WITH THE GIVEN BUSINESS AND/OR PRODUCT OBTAINED FROM THE TWO OR MORE INTERNET BASED BUSINESS RATINGS/REVIEW SYSTEM SOURCES OPERATION 205 is monitored and/or automatically updated and the updated data is provided to the owner/manager of the given business whenever the data changes.

In one embodiment, at PROVIDE THE AGGREGATED AND/OR PROCESSED REVIEW AND/OR RATINGS DATA ASSOCIATED WITH THE GIVEN BUSINESS AND/OR PRODUCT TO THE GIVEN BUSINESS OPERATION 207 the aggregated, and/or processed, review and/or ratings data of AGGREGATE AND/OR PROCESS THE REVIEW AND/OR RATINGS DATA ASSOCIATED WITH THE GIVEN BUSINESS AND/OR PRODUCT OBTAINED FROM THE TWO OR MORE INTERNET BASED BUSINESS RATINGS/REVIEW SYSTEM SOURCES OPERATION 205 is monitored and/or automatically updated and the updated data is provided to the owner/manager of the given business whenever the data changes by a specified amount.

In one embodiment, at PROVIDE THE AGGREGATED AND/OR PROCESSED REVIEW AND/OR RATINGS DATA ASSOCIATED WITH THE GIVEN BUSINESS AND/OR PRODUCT TO THE GIVEN BUSINESS OPERATION 207 the aggregated, and/or processed, review and/or ratings data of AGGREGATE AND/OR PROCESS THE REVIEW AND/OR RATINGS DATA ASSOCIATED WITH THE GIVEN BUSINESS AND/OR PRODUCT OBTAINED FROM THE TWO OR MORE INTERNET BASED BUSINESS RATINGS/REVIEW SYSTEM SOURCES OPERATION 205 is monitored and/or automatically updated and the updated data is provided to the owner/manager of the given business whenever the data changes by a specified threshold amount and/or in a specified direction, such as positive and/or negative.

In one embodiment, at PROVIDE THE AGGREGATED AND/OR PROCESSED REVIEW AND/OR RATINGS DATA ASSOCIATED WITH THE GIVEN BUSINESS AND/OR PRODUCT TO THE GIVEN BUSINESS OPERATION 207 the aggregated, and/or processed, review and/or ratings data of AGGREGATE AND/OR PROCESS THE REVIEW AND/OR RATINGS DATA ASSOCIATED WITH THE GIVEN BUSINESS AND/OR PRODUCT OBTAINED FROM THE TWO OR MORE INTERNET BASED BUSINESS RATINGS/REVIEW SYSTEM SOURCES OPERATION 205 is monitored and/or automatically updated and the updated data is provided to the owner/manager of the given business whenever the data indicates a negative rating and/or review or a rating and/or review below a defined threshold value.

In one embodiment, at PROVIDE THE AGGREGATED AND/OR PROCESSED REVIEW AND/OR RATINGS DATA ASSOCIATED WITH THE GIVEN BUSINESS AND/OR PRODUCT TO THE GIVEN BUSINESS OPERATION 207 the aggregated, and/or processed, review and/or ratings data of AGGREGATE AND/OR PROCESS THE REVIEW AND/OR RATINGS DATA ASSOCIATED WITH THE GIVEN BUSINESS AND/OR PRODUCT OBTAINED FROM THE TWO OR MORE INTERNET BASED BUSINESS RATINGS/REVIEW SYSTEM SOURCES OPERATION 205 is monitored and/or automatically updated and the owner/manager of the given business is issued a rating alert whenever the data indicates a cumulative/overall rating for the business below a defined threshold value.

In one embodiment, at PROVIDE THE AGGREGATED AND/OR PROCESSED REVIEW AND/OR RATINGS DATA ASSOCIATED WITH THE GIVEN BUSINESS AND/OR PRODUCT TO THE GIVEN BUSINESS OPERATION 207 the aggregated, and/or processed, review and/or ratings data of AGGREGATE AND/OR PROCESS THE REVIEW AND/OR RATINGS DATA ASSOCIATED WITH THE GIVEN BUSINESS AND/OR PRODUCT OBTAINED FROM THE TWO OR MORE INTERNET BASED BUSINESS RATINGS/REVIEW SYSTEM SOURCES OPERATION 205 is monitored and/or automatically updated and the owner/manager of the given business is issued a rating alert whenever the data indicates a negative rating and/or review or a rating and/or review below a defined threshold value.

In one embodiment, the rating alerts are generated and provided to the owner/manager of the given business through any network of computing systems and/or server systems, such as network 130 of FIG. 1, that is comprised of multiple different computers, wireless devices, cellular telephones, digital telephones, two-way pagers, personal digital assistants, server computers, or any desired combination of these devices, that are interconnected using a network.

Returning to FIG. 2, in one embodiment, the rating alerts are generated and provided to the owner/manager of the given business through e-mail or through text messaging.

In other embodiments, the rating alerts are generated and provided to the owner/manager of the given business using any method, apparatus, process, or mechanism for obtaining data, and/or for transferring data, images, screen displays, and/or text from one or more devices, computing systems, server systems, databases, web site/web functions and/or any systems to one or more other devices, computing systems, server systems, databases, web site/web functions and/or any systems, whether known at the time of filing or as thereafter developed.

As noted above, in one embodiment, the aggregated, and/or processed, review and/or ratings data of AGGREGATE AND/OR PROCESS THE REVIEW AND/OR RATINGS DATA ASSOCIATED WITH THE GIVEN BUSINESS AND/OR PRODUCT OBTAINED FROM THE TWO OR MORE INTERNET BASED BUSINESS RATINGS/REVIEW SYSTEM SOURCES OPERATION 205 provided to the owner/manager of the given business at PROVIDE THE AGGREGATED AND/OR PROCESSED REVIEW AND/OR RATINGS DATA ASSOCIATED WITH THE GIVEN BUSINESS AND/OR PRODUCT TO THE GIVEN BUSINESS OPERATION 207 includes data informing the business owner/manger of their overall rating score based on the aggregated, standardized, and/or categorized review and/or ratings data.

As also noted above, in one embodiment, the aggregated, and/or processed, review and/or ratings data of AGGREGATE AND/OR PROCESS THE REVIEW AND/OR RATINGS DATA ASSOCIATED WITH THE GIVEN BUSINESS AND/OR PRODUCT OBTAINED FROM THE TWO OR MORE INTERNET BASED BUSINESS RATINGS/REVIEW SYSTEM SOURCES OPERATION 205 provided to the owner/manager of the given business at PROVIDE THE AGGREGATED AND/OR PROCESSED REVIEW AND/OR RATINGS DATA ASSOCIATED WITH THE GIVEN BUSINESS AND/OR PRODUCT TO THE GIVEN BUSINESS OPERATION 207 includes data informing the owner/manager of the given business of the business' overall rating score as compared with the overall rating score for other specified businesses. In one embodiment, the given business is also ranked based on the business' overall rating score as compared with the overall rating score for other specified businesses.

In one embodiment, the comparison businesses are selected by the provider of process for providing an on-line reputation manager based on one or more comparison parameters such as, but not limited to, the type of business and/or the location of the business. In one embodiment, the comparison businesses are selected and/or modified by the owner/manager of the given business based on one or more comparison parameters such as, but not limited to, a specific business name, the type of business, and/or the location of the business.

In one embodiment, at PROVIDE THE AGGREGATED AND/OR PROCESSED REVIEW AND/OR RATINGS DATA ASSOCIATED WITH THE GIVEN BUSINESS AND/OR PRODUCT TO THE GIVEN BUSINESS OPERATION 207 the aggregated, and/or processed, review and/or ratings data of AGGREGATE AND/OR PROCESS THE REVIEW AND/OR RATINGS DATA ASSOCIATED WITH THE GIVEN BUSINESS AND/OR PRODUCT OBTAINED FROM THE TWO OR MORE INTERNET BASED BUSINESS RATINGS/REVIEW SYSTEM SOURCES OPERATION 205 provided to the owner/manager of the given business includes all, or a subset, of the specific reviews and/or rating submitted about the given business from the two or more Internet based business ratings/review systems of OBTAIN REVIEW AND/OR RATINGS DATA ASSOCIATED WITH A GIVEN BUSINESS AND/OR PRODUCT FROM TWO OR MORE INTERNET BASED BUSINESS RATINGS/REVIEW SYSTEM SOURCES OPERATION 203.

In one embodiment, at PROVIDE THE AGGREGATED AND/OR PROCESSED REVIEW AND/OR RATINGS DATA ASSOCIATED WITH THE GIVEN BUSINESS AND/OR PRODUCT TO THE GIVEN BUSINESS OPERATION 207 the aggregated, and/or processed, review and/or ratings data of AGGREGATE AND/OR PROCESS THE REVIEW AND/OR RATINGS DATA ASSOCIATED WITH THE GIVEN BUSINESS AND/OR PRODUCT OBTAINED FROM THE TWO OR MORE INTERNET BASED BUSINESS RATINGS/REVIEW SYSTEM SOURCES OPERATION 205 is provided to the owner/manager of the given business by providing a owner/manager of the given business access to one or more websites.

In one embodiment, at PROVIDE THE AGGREGATED AND/OR PROCESSED REVIEW AND/OR RATINGS DATA ASSOCIATED WITH THE GIVEN BUSINESS AND/OR PRODUCT TO THE GIVEN BUSINESS OPERATION 207 the aggregated, and/or processed, review and/or ratings data of AGGREGATE AND/OR PROCESS THE REVIEW AND/OR RATINGS DATA ASSOCIATED WITH THE GIVEN BUSINESS AND/OR PRODUCT OBTAINED FROM THE TWO OR MORE INTERNET BASED BUSINESS RATINGS/REVIEW SYSTEM SOURCES OPERATION 205 is provided to the owner/manager of the given business by providing an owner/manager of the given business access to any database, computing system, and/or a server system, or any web-site or other web-based system, associated with the process for providing an on-line reputation manager.

In one embodiment, at PROVIDE THE AGGREGATED AND/OR PROCESSED REVIEW AND/OR RATINGS DATA ASSOCIATED WITH THE GIVEN BUSINESS AND/OR PRODUCT TO THE GIVEN BUSINESS OPERATION 207 the aggregated, and/or processed, review and/or ratings data of AGGREGATE AND/OR PROCESS THE REVIEW AND/OR RATINGS DATA ASSOCIATED WITH THE GIVEN BUSINESS AND/OR PRODUCT OBTAINED FROM THE TWO OR MORE INTERNET BASED BUSINESS RATINGS/REVIEW SYSTEM SOURCES OPERATION 205 is provided to the owner/manager of the given business using a computer program product as discussed herein.

In one embodiment, at PROVIDE THE AGGREGATED AND/OR PROCESSED REVIEW AND/OR RATINGS DATA ASSOCIATED WITH THE GIVEN BUSINESS AND/OR PRODUCT TO THE GIVEN BUSINESS OPERATION 207 the aggregated, and/or processed, review and/or ratings data of AGGREGATE AND/OR PROCESS THE REVIEW AND/OR RATINGS DATA ASSOCIATED WITH THE GIVEN BUSINESS AND/OR PRODUCT OBTAINED FROM THE TWO OR MORE INTERNET BASED BUSINESS RATINGS/REVIEW SYSTEM SOURCES OPERATION 205 is provided to the owner/manager of the given business through, and/or from, a computing system implemented data management system that is a parent system for, implements, and/or is otherwise associated with, process for providing an on-line reputation manager 200.

In one embodiment, at PROVIDE THE AGGREGATED AND/OR PROCESSED REVIEW AND/OR RATINGS DATA ASSOCIATED WITH THE GIVEN BUSINESS AND/OR PRODUCT TO THE GIVEN BUSINESS OPERATION 207 the aggregated, and/or processed, review and/or ratings data of AGGREGATE AND/OR PROCESS THE REVIEW AND/OR RATINGS DATA ASSOCIATED WITH THE GIVEN BUSINESS AND/OR PRODUCT OBTAINED FROM THE TWO OR MORE INTERNET BASED BUSINESS RATINGS/REVIEW SYSTEM SOURCES OPERATION 205 is provided to the owner/manager of the given business through any network of computing systems and/or server systems that is comprised of multiple different computers, wireless devices, cellular telephones, digital telephones, two-way pagers, personal digital assistants, server computers, or any desired combination of these devices, that are interconnected using a network.

In one embodiment, at PROVIDE THE AGGREGATED AND/OR PROCESSED REVIEW AND/OR RATINGS DATA ASSOCIATED WITH THE GIVEN BUSINESS AND/OR PRODUCT TO THE GIVEN BUSINESS OPERATION 207 the aggregated, and/or processed, review and/or ratings data of AGGREGATE AND/OR PROCESS THE REVIEW AND/OR RATINGS DATA ASSOCIATED WITH THE GIVEN BUSINESS AND/OR PRODUCT OBTAINED FROM THE TWO OR MORE INTERNET BASED BUSINESS RATINGS/REVIEW SYSTEM SOURCES OPERATION 205 is provided to the owner/manager of the given business through e-mail or through text messaging.

In one embodiment, at PROVIDE THE AGGREGATED AND/OR PROCESSED REVIEW AND/OR RATINGS DATA ASSOCIATED WITH THE GIVEN BUSINESS AND/OR PRODUCT TO THE GIVEN BUSINESS OPERATION 207 the aggregated, and/or processed, review and/or ratings data of AGGREGATE AND/OR PROCESS THE REVIEW AND/OR RATINGS DATA ASSOCIATED WITH THE GIVEN BUSINESS AND/OR PRODUCT OBTAINED FROM THE TWO OR MORE INTERNET BASED BUSINESS RATINGS/REVIEW SYSTEM SOURCES OPERATION 205 is provided to the owner/manager of the given business through traditional postal service and/or traditional phone service.

In one embodiment, at PROVIDE THE AGGREGATED AND/OR PROCESSED REVIEW AND/OR RATINGS DATA ASSOCIATED WITH THE GIVEN BUSINESS AND/OR PRODUCT TO THE GIVEN BUSINESS OPERATION 207 the aggregated, and/or processed, review and/or ratings data of AGGREGATE AND/OR PROCESS THE REVIEW AND/OR RATINGS DATA ASSOCIATED WITH THE GIVEN BUSINESS AND/OR PRODUCT OBTAINED FROM THE TWO OR MORE INTERNET BASED BUSINESS RATINGS/REVIEW SYSTEM SOURCES OPERATION 205 is provided to the owner/manager of the given business using any method, apparatus, process, or mechanism for obtaining data, and/or for transferring data, images, screen displays, and/or text from one or more devices, computing systems, server systems, databases, web site/web functions and/or any systems to one or more other devices, computing systems, server systems, databases, web site/web functions and/or any systems, whether known at the time of filing or as thereafter developed.

In one embodiment, at PROVIDE THE AGGREGATED AND/OR PROCESSED REVIEW AND/OR RATINGS DATA ASSOCIATED WITH THE GIVEN BUSINESS AND/OR PRODUCT TO THE GIVEN BUSINESS OPERATION 207 the aggregated, and/or processed, review and/or ratings data of AGGREGATE AND/OR PROCESS THE REVIEW AND/OR RATINGS DATA ASSOCIATED WITH THE GIVEN BUSINESS AND/OR PRODUCT OBTAINED FROM THE TWO OR MORE INTERNET BASED BUSINESS RATINGS/REVIEW SYSTEM SOURCES OPERATION 205 is displayed on any display device such as display devices 115, 125, 165, and 189 of FIG. 1, and/or as discussed herein, and/or known in the art at the time of filing, and/or as developed after the time of filing. In one embodiment, the display device is associated with any computing system, such as computing systems 100, 140, 150, and/or sever system 120 of FIG. 1, and/or as discussed herein, and/or known in the art at the time of filing, and/or as developed after the time of filing.

FIG. 3 shows one embodiment of a rating notification 340 in accordance with one embodiment. Rating notification 340 is exemplary of the type of notification and/or alert that, in one embodiment, might be sent to the given business using, e-mail, text messaging, or any other communication mechanism providing a video and/or graphic display at PROVIDE THE AGGREGATED AND/OR PROCESSED REVIEW AND/OR RATINGS DATA ASSOCIATED WITH THE GIVEN BUSINESS AND/OR PRODUCT TO THE GIVEN BUSINESS OPERATION 207.

As shown in FIG. 3, one embodiment of a rating notification 340 is in the form of a display 341 shown on a display device 330. FIG. 3 shows a representation of a display screen 331 on display device 330, such as display device 189 of FIG. 1, including a rating notification 340 (FIG. 3) generated and sent to the selected business at PROVIDE THE AGGREGATED AND/OR PROCESSED REVIEW AND/OR RATINGS DATA ASSOCIATED WITH THE GIVEN BUSINESS AND/OR PRODUCT TO THE GIVEN BUSINESS OPERATION 207 (FIG. 2) notifying the given business of its overall rating as calculated at AGGREGATE AND/OR PROCESS THE REVIEW AND/OR RATINGS DATA ASSOCIATED WITH THE GIVEN BUSINESS AND/OR PRODUCT OBTAINED FROM THE TWO OR MORE INTERNET BASED BUSINESS RATINGS/REVIEW SYSTEM SOURCES OPERATION 205.

As seen in FIG. 3, rating notification 340 includes text informing the given business owner/manager that, in this specific example, "YOUR BUSINESS HAS AN OVERALL RATING OF 3 STARS BASED ON TWO REVIEWS FROM CUSTOMERS" In addition, the text includes "IF YOU WISH TO SEE THE DETAILED REVIEWS OF YOUR BUSINESS YOU CAN VIEW THEM AT: WWW.ON-LINE REPUTATION MANAGER.COM".

In the particular embodiment of a rating notification shown in FIG. 3, the selected business is not only informed of its rating and/or rating change, it is also informed of the existence of the on-line reputation manager provided by process for providing an on-line reputation manager 200.

Those of skill in the art will readily recognize that the choice of information displayed, the organization of the information displayed, and the manner in which the information is displayed in FIG. 3 was made for illustrative purposes only and that other types of information, organization of that information, and manner of displaying the information, can be implemented without departing from the scope of the invention as set forth in the claims below. In addition, those of skill in the art will readily recognize that various means for interfacing with, activating, or editing, the information displayed in FIG. 3 are possible, and that the specific means discussed above do not limit the invention as set forth in the claims below.

Returning to FIG. 2, in one embodiment, the owner/manager of the given business is also provided advice on how to address a given negative review and/or rating and/or how to improve the overall rating of the business at PROVIDE THE AGGREGATED AND/OR PROCESSED REVIEW AND/OR RATINGS DATA ASSOCIATED WITH THE GIVEN BUSINESS AND/OR PRODUCT TO THE GIVEN BUSINESS OPERATION 207.

In one embodiment, the advice provided at PROVIDE THE AGGREGATED AND/OR PROCESSED REVIEW AND/OR RATINGS DATA ASSOCIATED WITH THE GIVEN BUSINESS AND/OR PRODUCT TO THE GIVEN BUSINESS OPERATION 207 is based, at least in part, on all, or part of, the aggregated, and/or processed, review and/or ratings data of AGGREGATE AND/OR PROCESS THE REVIEW AND/OR RATINGS DATA ASSOCIATED WITH THE GIVEN BUSINESS AND/OR PRODUCT OBTAINED FROM THE TWO OR MORE INTERNET BASED BUSINESS RATINGS/REVIEW SYSTEM SOURCES OPERATION 205 and is directed to specific reviews/ratings.

In one embodiment, the advice provided at PROVIDE THE AGGREGATED AND/OR PROCESSED REVIEW AND/OR RATINGS DATA ASSOCIATED WITH THE GIVEN BUSINESS AND/OR PRODUCT TO THE GIVEN BUSINESS OPERATION 207 is based, at least in part, on all, or part of, the aggregated, and/or processed, review and/or ratings data of AGGREGATE AND/OR PROCESS THE REVIEW AND/OR RATINGS DATA ASSOCIATED WITH THE GIVEN BUSINESS AND/OR PRODUCT OBTAINED FROM THE TWO OR MORE INTERNET BASED BUSINESS RATINGS/REVIEW SYSTEM SOURCES OPERATION 205 and is directed to overall review/rating scores.

In one embodiment, the owner/manager of the given business is also provided a mechanism for addressing a given negative review and/or rating such as an e-mail link to the reviewer and/or any other grievance response mechanism such as a separate section of a website.

In one embodiment, once the aggregated, and/or processed, review and/or ratings data of AGGREGATE AND/OR PROCESS THE REVIEW AND/OR RATINGS DATA ASSOCIATED WITH THE GIVEN BUSINESS AND/OR PRODUCT OBTAINED FROM THE TWO OR MORE INTERNET BASED BUSINESS RATINGS/REVIEW SYSTEM SOURCES OPERATION 205 is then provided to the owner/manager of the given business at PROVIDE THE AGGREGATED AND/OR PROCESSED REVIEW AND/OR RATINGS DATA ASSOCIATED WITH THE GIVEN BUSINESS AND/OR PRODUCT TO THE GIVEN BUSINESS OPERATION 207, process flow proceeds to EXIT OPERATION 231.

In one embodiment, at EXIT OPERATION 231 process for providing an on-line reputation manager 200 is exited to await new data.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

Using process for providing an on-line reputation manager 200, an owner/manger of a business is provided a single source for accurate and/or up-to-date data regarding the on-line reputation of their businesses and, in one embodiment, a monitoring and alert mechanism that allows the owner/manger to become aware of any negative reviews/ratings and address them rapidly to eliminate, or minimize, the harm done to the business.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "obtaining", "aggregating", "storing", "saving", "displaying", "categorizing", "providing", "processing", "accessing", "selecting" etc., refer to the action and processes of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real time network operating systems.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as defined herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar and/or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIGS. for method and apparatus and/or process or application for providing scroll bar enabled bookmarks in electronic document displays, discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computing system for providing an on-line reputation manager comprising:
   two or more processors; and
   two or more memories coupled to the two or more processors, the two or more memories collectively having stored therein instructions which when executed by the two or more processors, perform a process comprising:
   obtaining ratings data associated with a given business from two or more Internet based business ratings systems;

aggregating the ratings data associated with the given business from the two or more Internet based business ratings systems;
providing at least part of the aggregated ratings data associated with the given business from the two or more Internet based business ratings systems to an agent associated with the given business, wherein the aggregated ratings data includes at least one negative rating; and
providing advice to the agent associated with the given business, the advice including how to address the at least one negative rating and how to improve the overall rating of the business.

2. The computing system for providing an on-line reputation manager of claim 1, wherein:
at least part of the ratings data associated with the given business is obtained from one or more websites associated with at least one of the two or more Internet based business ratings systems.

3. The computing system for providing an on-line reputation manager of claim 2, wherein:
at least part of the ratings data associated with the given business is obtained from one or more websites associated with at least one of the two or more Internet based business ratings systems using screen scraping technology.

4. The computing system for providing an on-line reputation manager of claim 1, wherein:
at least part of the ratings data associated with the given business is obtained from one or more Internet based business ratings systems that are dedicated review or ratings forum websites.

5. The computing system for providing an on-line reputation manager of claim 1, wherein:
at least part of the ratings data associated with the given business is obtained from one or more Internet based business ratings systems that are of a website type selected from the group of website types consisting of:
a retailer website;
an Internet warehouse website;
a product or service website;
a product or service provider website;
a product or service producer's website;
an Internet auction website;
a community-based website;
a social interaction website; and
a consumer watchdog site.

6. The computing system for providing an on-line reputation manager of claim 1, wherein:
at least part of the ratings data associated with the given business obtained from two or more Internet based business ratings systems is rating data selected from the group of rating data consisting of:
data representing all, or part of, one or more individual reviewer's ratings of the given business or product;
data representing an average of accumulated individual reviewer ratings for the given business or a product;
data representing any discrete symbol or symbols used to rate the given business or a product; and
data representing text or comments, or any portion thereof, submitted by one or more reviewers of the given business or a product.

7. The computing system for providing an on-line reputation manager of claim 1, further comprising:
processing the ratings data associated with the given business from the two or more Internet based business ratings systems.

8. The computing system for providing an on-line reputation manager of claim 7, wherein:
processing the ratings data associated with the given business from the two or more Internet based business ratings systems includes standardizing the ratings data associated with the given business from the two or more Internet based business ratings systems to map different rating or ranking scales used by the two or more two or more Internet based business ratings systems into a single rating system.

9. The computing system for providing an on-line reputation manager of claim 7, wherein:
processing the ratings data associated with the given business from the two or more Internet based business ratings systems includes categorizing the ratings data associated with the given business from the two or more Internet based business ratings systems according to one or more categories used by two or more Internet based business ratings systems.

10. The computing system for providing an on-line reputation manager of claim 7, wherein:
processing the ratings data associated with the given business from the two or more Internet based business ratings systems includes calculating an overall rating score for the given business based on the aggregated ratings data associated with the given business from the two or more Internet based business ratings systems.

11. The computing system for providing an on-line reputation manager of claim 1, wherein:
the aggregated ratings data associated with the given business from the two or more Internet based business ratings systems is provided to the agent associated with the given business automatically.

12. The computing system for providing an on-line reputation manager of claim 1, wherein:
the aggregated ratings data associated with the given business from the two or more Internet based business ratings systems is updated and the updated aggregated ratings data associated with the given business from the two or more Internet based business ratings systems is provided to the agent associated with the given business automatically on a periodic basis.

13. The computing system for providing an on-line reputation manager of claim 12, wherein:
the aggregated ratings data associated with the given business from the two or more Internet based business ratings systems is updated and the updated aggregated ratings data associated with the given business from the two or more Internet based business ratings systems is provided to the agent associated with the given business in response to one or more trigger events.

14. The computing system for providing an on-line reputation manager of claim 13, wherein:
at least one of the one or more trigger events is selected from the group of trigger events consisting of:
the aggregated ratings data associated with the given business from the two or more Internet based business ratings systems changing by a specified amount;
an overall rating score calculated based on the aggregated ratings data associated with the given business from the two or more Internet based business ratings systems changing by a specified amount;
the aggregated ratings data associated with the given business from the two or more Internet based business ratings systems indicates a negative rating or review;

the aggregated ratings data associated with the given business from the two or more Internet based business ratings systems indicates a rating or review below a defined threshold value; and the aggregated ratings data associated with the given business from the two or more Internet based business ratings systems includes a specified keyword.

15. The computing system for providing an on-line reputation manager of claim 1, further comprising:

providing the agent associated with the given business a rating notification alert in response to one or more trigger events.

16. The computing system for providing an on-line reputation manager of claim 15, wherein:

at least one of the one or more trigger events is selected from the group of trigger events consisting of:

the aggregated ratings data associated with the given business from the two or more Internet based business ratings systems changing by a specified amount;

an overall rating score calculated based on the aggregated ratings data associated with the given business from the two or more Internet based business ratings systems changing by a specified amount;

the aggregated ratings data associated with the given business from the two or more Internet based business ratings systems indicates a negative rating or review;

the aggregated ratings data associated with the given business from the two or more Internet based business ratings systems indicates a rating or review below a defined threshold value; and the aggregated ratings data associated with the given business from the two or more Internet based business ratings systems includes a specified keyword.

17. A system for providing an on-line reputation manager comprising:

a computing system;

two or more Internet based business ratings systems; and a processor for executing at least part of a process for providing an on-line reputation manager, the process for providing an on-line reputation manager comprising:

obtaining ratings data associated with a given business from at least two of the two or more Internet based business ratings systems;

aggregating the ratings data associated with the given business from the at least two of the two or more Internet based business ratings systems; and providing at least part of the aggregated ratings data associated with the given business from the at least two of the two or more Internet based business ratings systems to an agent associated with the given business, wherein the aggregated ratings data includes at least one negative rating;

providing advice to the agent associated with the given business, the advice including how to address the at least one negative rating and how to improve the overall rating of the business.

18. The system for providing an on-line reputation manager of claim 17, wherein:

at least part of the ratings data associated with the given business is obtained from one or more websites associated with at least one of the at least two of the two or more Internet based business ratings systems.

19. The system for providing an on-line reputation manager of claim 18, wherein:

at least part of the ratings data associated with the given business is obtained from one or more websites associated with at least one of the at least two of the two or more Internet based business ratings systems using screen scraping technology.

20. The system for providing an on-line reputation manager of claim 17, wherein:

at least part of the ratings data associated with the given business is obtained from one or more Internet based business ratings systems that are dedicated review or ratings forum websites.

21. The system for providing an on-line reputation manager of claim 17, wherein:

at least part of the ratings data associated with the given business is obtained from one or more Internet based business ratings systems that are of a website type selected from the group of website types consisting of:

a retailer website;

an Internet warehouse website;

a product or service website;

a product or service provider website;

a product or service producer's website;

an Internet auction website;

a community-based website;

a social interaction website; and a consumer watchdog site.

22. The system for providing an on-line reputation manager of claim 17, wherein:

at least part of the ratings data associated with the given business obtained from the at least two of the two or more Internet based business ratings systems is rating data selected from the group of rating data consisting of:

data representing all, or part of, one or more individual reviewer's ratings or reviews of the given business or product;

data representing an average of accumulated individual reviewer ratings for the given business or a product;

data representing any discrete symbol or symbols used to rate the given business or a product; and data representing text or comments, or any portion thereof, submitted by one or more reviewers of the given business or a product.

23. The system for providing an on-line reputation manager of claim 17, wherein:

the process for providing an on-line reputation manager further comprises:

processing the ratings data associated with the given business from the at least two of the two or more Internet based business ratings systems.

24. The system for providing an on-line reputation manager of claim 23, wherein:

processing the ratings data associated with the given business from the at least two of the two or more Internet based business ratings systems includes standardizing the ratings data associated with the given business from the at least two of the two or more Internet based business ratings systems to map different rating or ranking scales used by the at least two of the two or more Internet based business ratings systems into a single rating system.

25. The system for providing an on-line reputation manager of claim 23, wherein:

processing the ratings data associated with the given business from the at least two of the two or more Internet based business ratings systems includes categorizing the ratings data associated with the given business from the at least two of the two or more Internet based business ratings systems according to one or more categories used by at least one of the two or more Internet based business ratings systems.

26. The system for providing an on-line reputation manager of claim 23, wherein:

processing the ratings data associated with the given business from the at least two of the two or more Internet based business ratings systems includes calculating an overall rating score for the given business based on the aggregated ratings data associated with the given business from the at least two of the two or more Internet based business ratings systems.

27. The system for providing an on-line reputation manager of claim 17, wherein:

the aggregated ratings data associated with the given business from the at least two of the two or more Internet based business ratings systems is provided to the agent associated with the given business automatically.

28. The system for providing an on-line reputation manager of claim 17, wherein:

the aggregated ratings data associated with the given business from the at least two of the two or more Internet based business ratings systems is updated and the updated aggregated ratings data associated with the given business from the at least two of the two or more Internet based business ratings systems is provided to the agent associated with the given business automatically on a periodic basis.

29. The system for providing an on-line reputation manager of claim 28, wherein:

the aggregated ratings data associated with the given business from the at least two of the two or more Internet based business ratings systems is updated and the updated aggregated ratings data associated with the given business from the at least two of the two or more Internet based business ratings systems is provided to the agent associated with the given business in response to one or more trigger events.

30. The system for providing an on-line reputation manager of claim 29, wherein:

at least one of the one or more trigger events is selected from the group of trigger events consisting of:

the aggregated ratings data associated with the given business from the at least two of the two or more Internet based business ratings systems changing by a specified amount;

an overall rating score calculated based on the aggregated ratings data associated with the given business from the at least two of the two or more Internet based business ratings systems changing by a specified amount;

the aggregated ratings data associated with the given business from the at least two of the two or more Internet based business ratings systems indicates a negative rating or review;

the aggregated ratings data associated with the given business from the at least two of the two or more Internet based business ratings systems indicates a rating or review below a defined threshold value; and the aggregated ratings data associated with the given business from the at least two of the two or more Internet based business ratings systems includes a specified keyword.

31. The system for providing an on-line reputation manager of claim 17, wherein:

the process for providing an on-line reputation manager further comprises:

providing the agent associated with the given business a rating notification alert in response to one or more trigger events.

32. The system for providing an on-line reputation manager of claim 31, wherein:

at least one of the one or more trigger events is selected from the group of trigger events consisting of:

the aggregated ratings data associated with the given business from the at least two of the two or more Internet based business ratings systems changing by a specified amount;

an overall rating score calculated based on the aggregated ratings data associated with the given business from the at least two of the two or more Internet based business ratings systems changing by a specified amount;

the aggregated ratings data associated with the given business from the at least two of the two or more Internet based business ratings systems indicates a negative rating or review;

the aggregated ratings data associated with the given business from the at least two of the two or more Internet based business ratings systems indicates a rating or review below a defined threshold value; and the aggregated ratings data associated with the given business from the at least two of the two or more Internet based business ratings systems includes a specified keyword.

33. A computing program product for providing an on-line reputation manager comprising:

a non-transitory computer readable medium;

and computer program code, encoded on the computer readable medium, comprising computer readable instructions executed on a processor for:

aggregating the ratings data associated with the given business from the two or more Internet based business ratings systems;

providing at least part of the aggregated ratings data associated with the given business from the two or more Internet based business ratings systems to an agent associated with the given business, wherein the aggregated ratings data includes at least one negative rating; and providing advice to the agent associated with the given business, the advice including how to address the at least one negative rating and how to improve the overall rating of the business.

* * * * *